INVENTOR.
PAUL H. MUSKAT
BY Elliott & Pastoriza
ATTORNEYS

Feb. 27, 1962    P. H. MUSKAT    3,023,315
SOLAR BEACON FOR AIRCRAFT
Filed Nov. 7, 1958    2 Sheets-Sheet 2

INVENTOR.
PAUL H. MUSKAT
BY *Elliott & Pastoriza*
ATTORNEYS

United States Patent Office 3,023,315
Patented Feb. 27, 1962

3,023,315
SOLAR BEACON FOR AIRCRAFT
Paul H. Muskat, 3447 Beethoven St., Los Angeles, Calif.
Filed Nov. 7, 1958, Ser. No. 772,509
12 Claims. (Cl. 250—201)

This invention relates generally to signaling devices and more particularly to warning devices in the form of a novel solar beacon for aircraft.

Many warning devices for use on aircraft have been proposed heretofore particularly with respect to warning one aircraft of the presence of other aircraft in order to avoid mid-air collisions. Some of these devices include radio transmitters for continuously sending out signals. Suitable transponders or receivers and transmitters on other aircraft receive these signals and in turn automatically transmit a warning signal. In other instances, the principle of radar is employed wherein a single unit can be wholly contained within one aircraft for detecting the presence of other aircraft.

While the foregoing devices are operative, they are all relatively expensive to install and maintain. Moreover, the percentage of mid-air collisions, when considering the number of daily flights, is evidently still not sufficiently large to warrant the expense of installing such devices on all aircraft.

It is well known that the best warning constitutes a direct visual observation of the other aircraft by the pilot since his response time is quickest under these circumstances. With the use of electronic gear as described above, the pilot must make a mental interpretation of the data displayed on a screen or in his earphones. Considering the high speed of present day planes, particularly jet aircraft, the pilot's reaction time may still not be sufficient to avoid a mid-air collision.

During night flying, it is required that aircraft be provided with certain types of beacon lights to warn of their presence. Such beacon lights are visible for a considerable distance at night and this probably accounts for the relatively few mid-air collisions that have actually occurred at night. In fact, it is found that more than ninety percent of all mid-air collisions occur during bright daylight. It will be evident, of course, that conventional artificial light beacons on aircraft are essentially useless in the daytime and thus in the absence of any of the heretofore proposed electronic gear, the pilot, up to the present time, has had to rely on direct visual observation of other aircraft to avoid mid-air collisions.

Bearing the foregoing in mind, it is a primary object of the present invention to provide a novel warning system for an aircraft which takes advantage of the presence of sunlight during the day to provide a beacon signal to warn other aircraft of its presence.

More particularly, it is an object to provide a solar type beacon adapted to be secured to an aircraft capable of warning other aircraft up to a distance of forty miles of the presence of the one aircraft in any azimuthal direction.

Still other important objects of this invention are to provide an anti-mid-air collision warning device which is extremely economical to manufacture and install, which requires substantially no maintenance, and which does not require any co-operating gear on any other aircraft in order to make its presence known to such other aircraft.

Briefly, these and many other objects and advantages of this invention are attained by providing first and second mirrors arranged to be mounted on an aircraft. The first mirror is rotatably mounted for movement about two different axes at right angles to each other so that it may pick up the sun's rays during the daytime and reflect them in a desired direction, preferably along a vertical axis. The second mirror is disposed at substantially forty-five degrees to such vertical axis and has its center lying on the vertical axis so that it will receive the reflected rays from the first mirror and project them out in a substantially horizontal beam. A suitable mounting system for the second mirror is provided which will enable the second mirror to be rotated about the vertical axis so that the horizontally projected beam will sweep over 360 degrees in azimuth. The beam is of sufficient intensity as to be visible to other aircraft up to forty miles distance.

In order to maintain the sun's rays projecting on the second mirror in a proper vertical direction from the first mirror when the aircraft changes course or as the sun assumes different positions, a light responsive means is positioned immediately behind the second mirror. The second mirror is in turn provided with a center opening through which a small portion of the sunlight reflected from the first mirror passes when the first mirror is properly aligned. The light responsive means is connected to suitable driving means for rotating the first mirror about its respective axes. By this arrangement, a deviation in the direction of the sunlight from the first mirror toward the second mirror will result in a signal in the light responsive means which signal will cause the drive means to move the first mirror automatically in a direction to maintain the sun's rays in substantial alignment with the vertical axis.

A better understanding of the invention and its operation will be had by referring to one embodiment thereof as illustrated in the accompanying drawings in which.

Figure 1:
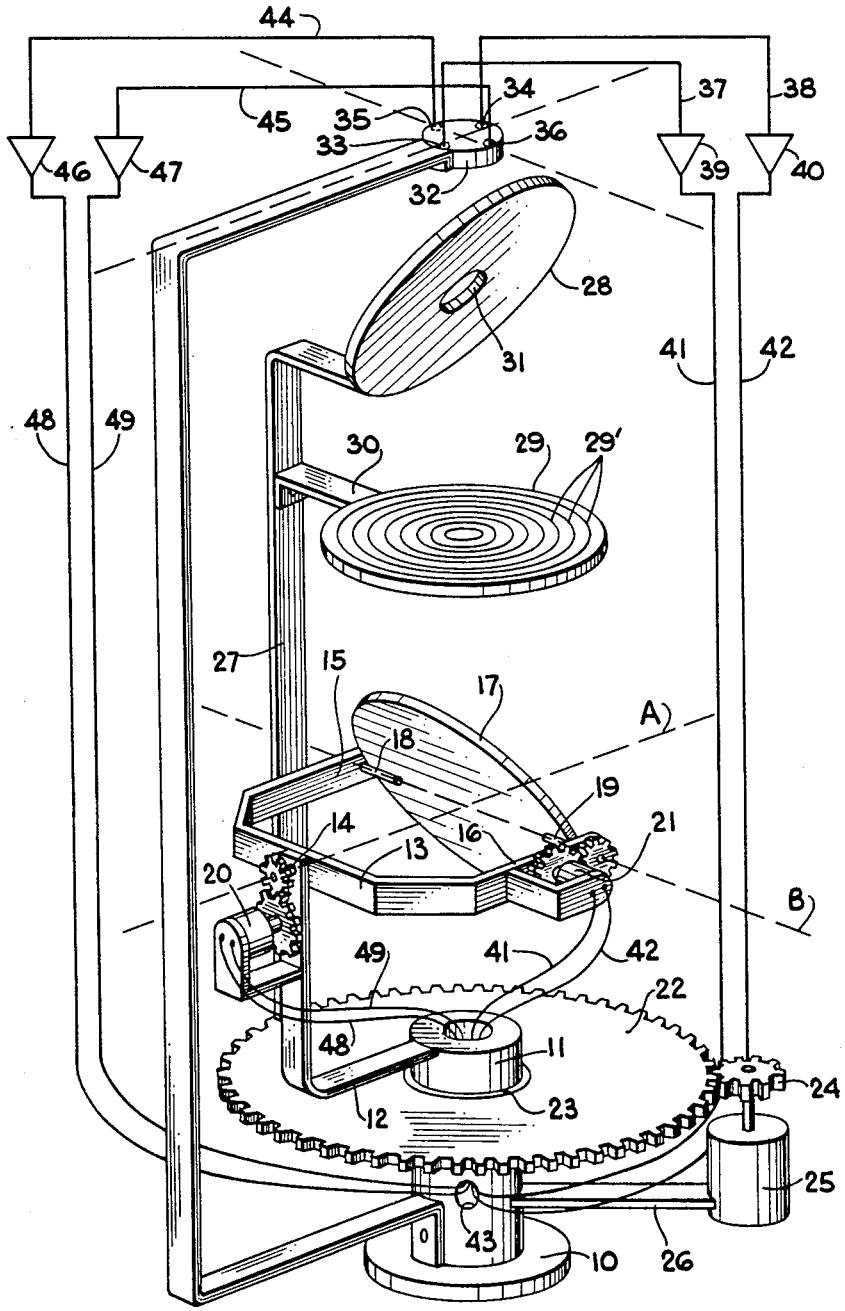
FIGURE 1 is an overall perspective view partly schematic in form illustrating the solar beacon of this invention.

Referring to FIGURE 1, the solar beacon comprises a supporting base 10 which may be secured to the top of the aircraft fuselage. The base 10 includes a vertical column 11 rigidly secured to the base and terminating at its upper end in a supporting structure in the form of a laterally and upwardly extending arm 12. A yoke 13 is pivoted to the upper end of the arm 12 as by a pivot shaft 14 so that the yoke is capable of rotation about a horizontal axis indicated at A.

The yoke includes extending arms 15 and 16 between which is positioned a first mirror 17 mounted as by pivot pins 18 and 19 to the ends of the yoke arms for rotation about a second horizontal axis indicated at B. The axis B forms a right angle with the axis A so that by rotation of the first mirror 17 about these axes, the sun's rays from any position between the horizon and zenith may be reflected substantially along a vertical axis passing through the center of the first mirror 17 and the column 11 of the base 10. It is desirable to be able to move the mirror 17 about either axis automatically. To this end there is provided a servo motor 20 connected through suitable gears to the pivot shaft 14 of the yoke 13 for rotation of the mirror about the axis A. Similarly, there is provided a second servo motor 21 also connected through suitable gears to the pivot pin 19 for effecting rotation of the mirror 17 about the axis B.

Journaled about the column 11 just below the arm 12 of the supporting structure is a turn table 22 lying in a substantially horizontal plane and arranged to rotate about the vertical axis of the column 11 by means of a suitable journal bearing indicated schematically at 23. The periphery of the turn table 22 may include gear teeth for inter-engagement with a driving gear 24 connected to a drive motor 25. The motor 25 in turn may be supported by a lateral member 26 rigidly secured to the lower portion of the column 11.

Adjacent a peripheral portion of the turn table 22, there is provided an upstanding support arm 27 spaced laterally from the vertical central axis of the column 11 and serving to support a second mirror 28 at its upper end. It will, accordingly, be evident that when the turn table 22 is rotated about the vertical axis, the second mirror 28 will also rotate about this vertical axis and any sunlight reflected from the first mirror 17 up to the second mirror 28 will be projected outwardly in substantially a horizontal beam which will sweep over 360 degrees in azimuth.

The upwardly extending support arm 27 also serves to support a lens 29 provided with a series of annular ridges 29' for diffusing light passing from the mirror 17 towards the mirror 28. A suitable support bracket 30 rigidly holds the lens 29 with its center in axial alignment with the vertical axis of the structure. The purpose for the diffusing lens 29 is to diffuse the sunlight sufficiently so that the horizontal beam reflected from the mirror 28 will be widened out with increasing horizontal distance so as to be visible to aircraft at altitudes above and below the horizontal azimuthal plane along which the beam is swept.

In order to automatically maintain the sunlight reflected from the mirror 17 in vertical alignment with the vertical axis of the structure so that it will properly strike the mirror 28, this mirror is provided with a central opening 31 through which a portion of the sunlight passes when it is properly aligned with the vertical axis. A light responsive means 32 is positioned to the rear of the mirror 28 in alignment with the opening 31 and vertical axis and includes four photo-electric cells on its underside as indicated in dotted lines at 33, 34, 35, and 36. The photo-electric cells 33 and 34 form the diagonally opposing corners of a square while the photo-cells 35 and 36 form the other two diagonal corners of the square. The diagonals of these squares are respectively parallel to the axes A and B representing the axes of rotation for the first mirror 17. With respect to the two photo-cells 33 and 34, there are provided connecting leads 37 and 38 passing to a first pair of suitable power amplifiers 39 and 40. The outputs of these two amplifiers are connected through leads 41 and 42 which pass downwardly into a suitable opening 43 in the base structure column 11, to the servo motor 21 and thus signals appearing on either one of the leads 41 or 42 will energize the servo motor 21 to rotate the mirror 17 in one direction or the other about the horizontal axis B.

Similarly, the photo cells 35 and 36 are connected by leads 44 and 45 to the input of a second pair of amplifiers 46 and 47. The outputs of these two amplifiers are in turn connected to leads 48 and 49 which also pass downwardly and into the opening 43 and up through the central column 11 to the servo motor 20. Therefore, a signal in either of the leads 48 or 49 will cause the servo motor 20 to rotate the yoke 13 in one direction or the other about the horizontal axis A.

The operation of the overall system of FIGURE 1 will be evident from the foregoing description. Initially, the base structure 10 is rigidly secured to a level portion of the aircraft such that the first mirror 17 projects preferably above the upper fuselage portion of the craft so that it can receive sunlight from any azimuthal direction. This mirror 17 may be manually adjusted by suitable rotation about the axis A and the axis B until sunlight is caused to pass vertically upwardly through the lens 29 to strike the mirror 28. Since the photo-electric cells form a square array the center of which falls on the vertical axis, a portion of this sunlight passing up through the hole 31, will be substantially evenly distributed on each of the photo-cells and, therefore, currents therefrom will be all substantially equal. The corresponding amplified currents in the leads 41, 42, and 48, and 49 will thus be the same and there will be no potential difference applied to the motors 21 and 20. Therefore, the mirror 17 will be retained in its set position. The motor 25 may then be started from any suitable electrical power source to rotate the turn table 22 causing the second mirror 28 to rotate about the vertical axis and thus project a horizontal beam of sunlight over 360 degrees in azimuth.

As the sun moves across the sky or as the aircraft changes course, the first mirror 17 will automatically track the sun as a consequence of the photo-electric cell arrangement described. Thus, should the reflected sunlight beam deviate from the vertical axis, it will approach closer to one of the four photo-cells than to any of the others. For example, should the reflected sunlight from mirror 17 deviate slightly to the left of the vertical axis as viewed in FIGURE 1, the photo-cell 35 will receive a greater light intensity and there will thus be generated a current in the lead 44 of greater magnitude than the currents generated in any of the other leads. This current will be amplified by the amplifier 46 and passed to the servo motor 20 which will cause a rotation of the yoke 13 in a proper direction. In the illustration under discussion, this rotation would be in a clockwise direction as viewed from the pivot pin 14, to cause the reflected beam to move back into alignment with the vertical axis. As a consequence of this movement, the intensity of light on the photo-cell 35 will fall back to a value equal to that when the beam is properly aligned on the vertical axis and thus the current in the amplifier 46 and lead 48 will diminish until balanced by the current in the lead 49, and the motor 20 will stop.

The servo motor 21 operates in an identical manner in co-operation with the photo-electric cells 33 and 34. It will, of course, be evident that both motors can operate simultaneously and in an amount proportional to the degree of deviation of the beam.

The above described tracking system for enabling the first mirror 17 to follow the sunlight and reflect it in a desired direction is but one manner of effecting this desired result. It will, of course, be understood by those skilled in the art that other suitable tracking means, such as infra-red detectors as employed on some missiles, may be used for maintaining the sunlight reflected from the first mirror 17 in substantial vertical alignment with the central axis to strike the second mirror 28 properly.

As a consequence of the rotation of the turn table 22, there will be provided a horizontal beam of sunlight swept in azimuth over 360 degrees continuously. If the diffusing lens 29 illustrated in FIGURE 1 were not employed, the penciled beam of light reflected from the mirror 28 would be extremely narrow and unless another aircraft were at substantially the same altitude of the aircraft employing the solar beacon, it would not necessarily observe the light flash as the beacon rotates. By the use of a diffusing lens such as indicated at 29, however, the reflected horizontal beam is diffused to an extent sufficient to widen it and thus enable aircraft at slightly different altitudes to observe the beam. It should be understood that the widening of the projected horizontal beam need not be excessive inasmuch as the altitude of planes in the neighborhood at which the beam could not be observed would be sufficiently different from the altitude of the plane employing the beacon as to avoid any collision in the first place. Essentially, the only aircraft that need be warned are those at an altitude dangerously close to the altitude of the aircraft employing the device.

Figure 2:
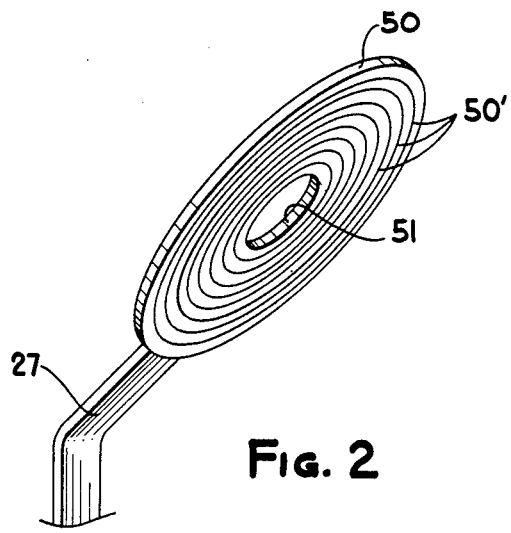
FIGURE 2 is a fragmentary perspective view of a modified type of mirror for use with the apparatus of FIGURE 1; and, FIGURE 3 is another fragmentary perspective view of another modified type of mirror for use with the apparatus of FIGURE 1.

Referring now to FIGURE 2, there is shown a mirror 50 which may be substituted for the second mirror 28 of FIGURE 1 and thereby enable the elimination of the lens 29. As shown in FIGURE 2, the mirror 50 includes a reflecting surface that deviates from an optical flat by the provision of annular ridges 50' similar to the lens ridges 29'. Mirror 50 is provided with a central opening 51 corresponding to the opening 31 in the second mirror 28 of FIGURE 1. The annular ridges 50' serve to widen the reflected horizontal beam as described in connection with the diffusing lens 29.

Figure 3:
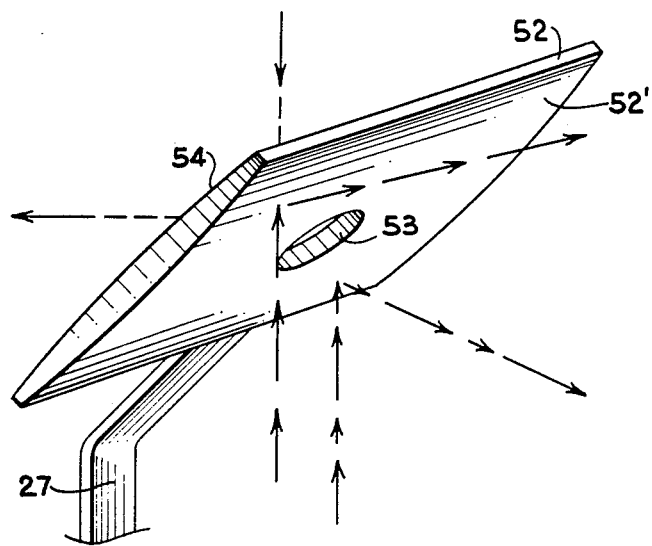

FIGURE 3 shows yet another modification of the mirror for reflecting the horizontal beam. In FIGURE 3, the mirror 52 is provided with a convex cylindrical reflecting surface 52'. The axis of this cylindrical surface is horizontal and is at right angles to the horizontal beam reflected from its surface. Thus, the beam horizontally reflected from the cylindrically shaped mirror 52 will have a fan shaped cross section when viewed in a vertical plane. As in the case of the diffusion lens and diffusion mirror, the degree of curvature of the reflecting surface 52' of the mirror 52 need not be large and in fact need only be sufficient to cause the horizontal beam to diverge enough to warn pilots at a distance of ten miles and within a thousand feet altitude or so of the aircraft carrying the device.

In the event the sun is directly overhead, the rear side 54 of the mirror 52 as shown in FIGURE 3 may be provided with a cylindrical reflecting surface so that the sun's rays are directly reflected horizontally, as indicated by the arrows, the first mirror not being used. Clearly, the mirrors of FIGURES 1 and 2 can similarly be provided with reflecting rear surfaces to provide a sweeping beam when the sun is directly overhead.

In both FIGURES 2 and 3, the mirrors 50 and 52 may be secured to the upwardly extending arm 27 of FIGURE 1.

From the foregoing, it will be evident that the present invention provides a greatly improved anti-collision warning device which is admirably suited for use during daylight hours when most such collisions occur. Not only is the device extremely simple and thus subject to little maintenance, but it will provide a relatively intense warning light as a consequence of the utilization of the sun's rays itself.

Various modifications of the invention will occur to those skilled in the art. The aircraft solar beacon is, therefore, not to be thought of as limited to the specific embodiment set forth for illustrative purposes.

What is claimed is:

1. A solar beacon for aircraft comprising, in combination: a first mirror mounted for movement about two different axes; a second mirror having the plane of its reflecting surface disposed at substantially forty-five degrees with respect to a straight line axis passing through the centers of said first and second mirrors, so that said first mirror is adjustable to reflect the sun's rays in the direction of said axis to strike said second mirror and be reflected to provide a beam in a direction at right angles to said axis; and means for rotating said second mirror about said axis which passes through centers of said first and second mirrors whereby said beam is swept in azimuth three hundred and sixty degrees when said axis is vertically disposed.

2. The subject matter of claim 1, in which said second mirror includes a central opening; light responsive means positioned on said vertical axis to the rear of said second mirror to receive light through said opening; signal generating means connected to said light responsive means, said light responsive means being responsive to a deviation in the direction of said light from said vertical axis to actuate said signal generating means; and drive means connected to said first mirror for rotationally positioning said mirror with respect to said two different axes, said drive means being connected to said signal generating means to reposition said first mirror to maintain the reflection of said sunlight along said vertical axis.

3. The subject matter of claim 1, including a light diffusing lens positioned along said axis between said first mirror and said second mirror.

4. The subject matter of claim 1, in which the reflecting surface of said second mirror deviates from an optical flat to diffuse the light in said beam.

5. The subject matter of claim 1, in which the reflecting surface of said second mirror is of cylindrical shape, the axis of said cylindrical shape extending in a direction at right angles to the direction of said beam and at right angles to said axis whereby said beam is fan shaped as viewed in the plane of said beam and axis.

6. A solar beacon for securement to aircraft to warn other aircraft and ground stations of the presence of said aircraft, comprising: a base structure for mounting to said aircraft; a yoke mounted to said base structure for rotation about a first axis; a first mirror pivoted at diametrically opposite peripheral portions to said yoke for rotation about a second axis at right angles to said first axis; a turn table journaled to said base structure for rotation about a vertical axis passing through the center of said first mirror, said base structure passing centrally through said turn table; a support arm secured to said turn table and extending vertically in laterally spaced relationship to said vertical axis; a second mirror secured to said support arm with the plane of its reflecting surface disposed at substantially forty-five degrees with respect to the horizon and its center falling on said vertical axis; and motor means for rotating said turn table whereby said second mirror is rotated about said vertical axis.

7. The subject matter of claim 6, including first and second drive means for respectively rotating said first mirror about said first and second axes respectively to a position to reflect rays from the sun along said vertical axis, said second mirror including a central opening through which a portion of said sun rays pass; and light responsive means positioned to the rear of said second mirror on said vertical axes for receiving light through said opening, said light responsive means being connected to said first and second drive means for generating a signal in response to a deviation of said sun rays from said vertical axis to energize said drive means and move said first mirror until said sun's rays are back in alignment with said vertical axis, other portions of said sun rays being reflected from said second mirror in a horizontal beam.

8. The subject matter of claim 7, in which said light responsive means includes four photo-electric cells forming the corners of a square the diagonals of which run in directions parallel to said first and second axes respectively; a first pair of amplifiers having their inputs connected respectively to two of said photo-electric cells that are diagonally positioned, the outputs of said first pair of amplifiers connecting to said first drive means; and a second pair of amplifiers having their inputs connected respectively to the other two of said photo-electric cells, the outputs of said second pair of amplifiers connecting to said second drive means, whereby said drive means are driven to rotate said first mirror in directions such as to equalize the signals from all of said photo-electric cells and amplifiers by positioning said portion of sun rays passing through said opening at substantially the geometrical center of said square formed by said photo-electric cells.

9. The subject matter of claim 7, including a light diffusing lens positioned on said vertical axis between said first mirror and said second mirror, said light diffusing lens being supported by said support arm.

10. The subject matter of claim 7, in which the reflecting surface of said second mirror deviates from an optical flat to diffuse the light in said horizontal beam.

11. The subject matter of claim 7, in which the reflecting surfaces of said second mirror is of cylindrical shape, the axis of said cylindrical shape extending in a horizontal direction at right angles to the direction of said horizontal beam whereby said beam is fan shaped as viewed in a vertical plane.

12. The subject matter of claim 6, in which said second mirror is provided with a reflecting surface on its rear side so that sun's rays from vertically overhead will strike said rear side and be reflected in a horizontal beam.

References Cited in the file of this patent

UNITED STATES PATENTS

| | | |
|---|---|---|
| 2,132,676 | Chance | Oct. 11, 1938 |
| 2,153,448 | Boaz | Apr. 4, 1939 |
| 2,403,387 | McLennan | July 2, 1946 |
| 2,604,601 | Menzel | July 22, 1952 |
| 2,645,150 | Robbins | July 14, 1953 |
| 2,684,007 | Newell | July 20, 1954 |
| 2,697,379 | Walker | Dec. 21, 1954 |
| 2,766,387 | Bolsey | Oct. 9, 1956 |
| 2,798,478 | Tarcici | July 9, 1957 |